United States Patent
Koyama

(10) Patent No.: US 9,172,314 B2
(45) Date of Patent: Oct. 27, 2015

(54) REGENERATIVE CONTROL SYSTEM OF A VEHICLE

(75) Inventor: Takashi Koyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 13/500,555

(22) PCT Filed: Feb. 17, 2011

(86) PCT No.: PCT/JP2011/053385
§ 371 (c)(1),
(2), (4) Date: Apr. 5, 2012

(87) PCT Pub. No.: WO2012/111128
PCT Pub. Date: Aug. 23, 2012

(65) Prior Publication Data
US 2014/0210384 A1    Jul. 31, 2014

(51) Int. Cl.
*H02P 3/14* (2006.01)
*H02J 1/00* (2006.01)
(Continued)

(52) U.S. Cl.
CPC ... *H02P 3/14* (2013.01); *B60L 1/02* (2013.01); *B60L 3/0046* (2013.01); *B60L 7/14* (2013.01); *B60L 7/18* (2013.01); *B60L 11/14* (2013.01); *B60L 11/1868* (2013.01); *B60L 15/2009* (2013.01); *B60L 2240/12* (2013.01); *B60L 2240/423* (2013.01); *B60L 2240/445* (2013.01); *B60L 2240/486* (2013.01); *B60L 2250/26* (2013.01); *B60L 2270/145* (2013.01); *Y02T 10/642* (2013.01); *Y02T 10/70* (2013.01); *Y02T10/7005* (2013.01); *Y02T 10/7066* (2013.01); *Y02T 10/7077* (2013.01); *Y02T 10/7275* (2013.01)

(58) Field of Classification Search
CPC .......... H02P 3/14; B60L 1/02; B60L 3/0046; B60L 7/14; B60L 7/18; B60L 11/14; B60L 11/1868; B60L 15/2009
USPC ......... 318/376, 362, 261, 703, 757, 373, 759, 318/763, 375; 322/7; 310/76, 77
See application file for complete search history.

(56) References Cited

U.S. PATENT DOCUMENTS

| 6,384,551 | B1 | 5/2002 | Watanabe |
| 2002/0047686 | A1 | 4/2002 | Kodama et al. |

(Continued)

FOREIGN PATENT DOCUMENTS

| JP | A-09-074693 | 3/1997 |
| JP | A-2000-184613 | 6/2000 |

(Continued)

OTHER PUBLICATIONS

May 17, 2011 International Search Report issued in International Patent Application No. PCT/JP2011/053385 (with translation).

*Primary Examiner* — Bentsu Ro
*Assistant Examiner* — Zemenay Truneh
(74) *Attorney, Agent, or Firm* — Oliff PLC

(57) ABSTRACT

A regenerative control system of a vehicle is constructed such that in a system which generates electrical energy of a low voltage suitable for a low voltage system circuit and electrical energy of a high voltage suitable for the high voltage system circuit in an alternate manner by making use of kinetic energy of a vehicle when the vehicle is in a deceleration running state, a ratio between a period of time to generate the low voltage electrical energy and a period of time to generate the high voltage electrical energy is decided in accordance with a deceleration required of the vehicle, and a power generation voltage is duty controlled according to the ratio thus decided.

17 Claims, 10 Drawing Sheets

(51) Int. Cl.
*B60L 7/18* (2006.01)
*B60L 11/18* (2006.01)
*B60L 15/20* (2006.01)
*B60L 1/02* (2006.01)
*B60L 3/00* (2006.01)
*B60L 7/14* (2006.01)
*B60L 11/14* (2006.01)

(56) References Cited

U.S. PATENT DOCUMENTS

2004/0070372 A1* 4/2004 Kawai et al. .................. 322/7
2006/0097577 A1* 5/2006 Kato et al. .................. 307/10.1
2006/0113129 A1* 6/2006 Tabata ......................... 180/65.2
2007/0247115 A1* 10/2007 Ishikawa et al. ............. 320/119
2010/0327878 A1* 12/2010 Ishikawa et al. ............. 324/537
2011/0133920 A1* 6/2011 Meadors ...................... 340/439

FOREIGN PATENT DOCUMENTS

| | | |
|---|---|---|
| JP | A-2002-135993 | 5/2002 |
| JP | A-2006-174543 | 6/2006 |
| JP | A-2007-018871 | 1/2007 |
| JP | A-2009-033794 | 2/2009 |
| JP | A-2011-055639 | 3/2011 |

* cited by examiner

REGENERATIVE CONTROL SYSTEM OF A VEHICLE

TECHNICAL FIELD

The present invention relates to a technique in which the kinetic energy of a vehicle is caused to be regenerated to electrical energy, at the time of deceleration running of the vehicle.

BACKGROUND ART

In recent years, there has been proposed a vehicle having a plurality of batteries mounted thereon, of which the rated voltages are different from one another. In such a vehicle, there has been a possibility that at the time of changing the power generation voltage of a generator, the drive torque of the generator changes, so vibration and/or noise may be generated. On the other hand, there has been proposed a technique in which a difference between the drive torque at the time of charging a low voltage battery and the drive torque at the time of charging a high voltage battery is caused to reduce by stopping the power generation operation of a generator intermittently at the time of charging the high voltage battery (for example, see a Patent Document 1).

In a Patent Document 2, there is described a technique in which in a vehicle having a low voltage battery and a high voltage battery mounted thereon, of which the rated voltages are different from each other, the low voltage battery and the high voltage battery are charged in an alternate manner.

In a Patent Document 3, there is described a technique in which in cases where an overvoltage occurs in any of a plurality of cells of a lithium-ion battery which is composed of the plurality of cells connected in series to one another, the charge voltage of the lithium-ion battery is made lower than a specified value.

In a Patent Document 4, there is described a technique in which at the time of regenerative braking of a hybrid vehicle which has an internal combustion engine and an electric motor mounted thereon as power sources, the surplus electric power which can not be charged to a battery is selectively supplied to a plurality of electric loads.

In a Patent Document 5, there is described a technique in which in a vehicle provided with a changeover switch which is adapted to be switched over so as to distribute an output of a generator between a storage battery of a low voltage system and an electric load of a high voltage system, the output voltage of the generator is once made lower at the time when the changeover switch is switched over.

PRIOR ART DOCUMENTS

Patent Documents

Patent Document 1: Japanese patent application Laid-open No 2002-135993

Patent Document 2: Japanese patent application Laid-open No. 2000-184613

Patent Document 3: Japanese patent application Laid-open No. 2007-018871

Patent Document 4: Japanese patent application Laid-open No 2006-174543

Patent Document 5: Japanese patent application Laid-open No. H09-074693

DISCLOSURE OF THE INVENTION

Problem to be Solved by the Invention

Incidentally, in cases where the kinetic energy of a vehicle is caused to be regenerated to electrical energy thereby to charge a low voltage battery and a high voltage battery in an alternate manner, when the power generation operation of a generator is intermittently stopped at the time of charging the high voltage battery, the amount of charge in the high voltage battery may decrease, or the kinetic energy regenerated to the electrical energy may decrease.

The present invention has been made in view of the above-described situation, and its object is to provide a technique in which in a regenerative control system of a vehicle which serves to regenerate kinetic energy of the vehicle to electrical energy at the time of deceleration running of the vehicle so that the electrical energy thus regenerated is supplied to a low voltage system circuit and a high voltage system circuit in an alternate manner, a regenerative ratio can be improved while suppressing a change in a regenerative braking force caused by a change in a power generation voltage.

Means for Solving the Problem

The present invention adopts the following means in order to solve the above-mentioned problems.
That is, a regenerative control system of a vehicle according to the present invention is provided with:
a low voltage system circuit including a low voltage battery;
a high voltage system circuit including a high voltage battery of which a rated voltage is higher than that of said low voltage battery;
a power generation unit that generates electrical energy of a low voltage suitable for said low voltage system circuit or electrical energy of a high voltage suitable for said high voltage system circuit by making use of kinetic energy of the vehicle; and
a control unit that controls said power generation unit in such a manner that said low voltage electrical energy and said high voltage electrical energy are generated in an alternate manner when the vehicle is in a deceleration running state, and at the same time duty controls a ratio between a period of time during which said low voltage electrical energy is generated, and a period of time during which said high voltage electrical energy is generated.

In such a construction, in cases where the kinetic energy of the vehicle in the deceleration running state thereof is converted (regenerated) into electrical energy, the power generation unit generates the electrical energy of a low voltage (hereinafter referred to as "low voltage energy"), and the electrical energy of a high voltage (hereinafter referred to as "high voltage energy") in an alternate manner. That is, the power generation unit generates electricity in a continuous manner, while changing over the power generation voltage between the low voltage and the high voltage in an alternate manner. In that case, the sum (the cycle of duty control) of the period of time for the power generation unit to generate the low voltage energy and the period of time for the power generation unit to generate the high voltage energy should be set to be a short cycle to such an extent that a driver or passenger(s) feels that the magnitude of the regenerative braking force is substantially constant.

When the power generation voltage at the time of regenerative braking is controlled in this manner, it becomes possible to supply the electrical energy regenerated from the kinetic energy of the vehicle to both of the low voltage system circuit and the high voltage system circuit, while suppressing a change in the regenerative braking force caused by the change over of the power generation voltage. In addition, there is no need to stop the power generation operation of the power generation unit in an intermittent manner, so the amount of regeneration of kinetic energy can be increased as much as possible. Moreover, the ratio between the period of time of power generation of the low voltage energy and the period of time of power generation of the high voltage energy can be set arbitrarily, so it also becomes possible to supply desired amounts of electrical energy to both of the low voltage system circuit and the high voltage system circuit, respectively, in one deceleration running operation.

Accordingly, according to the present invention, in the regenerative control system of a vehicle which serves to regenerate the kinetic energy of the vehicle to electrical energy at the time of deceleration running of the vehicle so that the electrical energy thus regenerated is supplied to the low voltage system circuit and the high voltage system circuit in an alternate manner, a regenerative ratio can be improved while suppressing a change in the regenerative braking force caused by a change in the power generation voltage.

The regenerative control system of a vehicle according to the present invention may be further provided with a decision unit that decides the ratio between the period of time for said power generation unit to generate said low voltage electrical energy and the period of time for said power generation unit to generate said high voltage electrical energy, in accordance with a deceleration required of the vehicle. In that case, the control unit should carry out duty control of the power generation voltage of said power generation unit in accordance with the ratio decided by said decision unit.

In such a construction, the ratio between the period of time for the power generation unit to generate the low voltage energy and the period of time for the power generation unit to generate the high voltage energy is decided in accordance with the required deceleration of the vehicle, as a result of which the regenerative braking force becomes a magnitude suitable for the required deceleration. For example, in cases where the required deceleration is high, the period of time of power generation of the high voltage energy should be made longer, and at the same time, the period of time of power generation of the low voltage energy should be made shorter, as compared with the case where the required deceleration is low.

When the power generation voltage at the time of regenerative braking is controlled in this manner, it becomes possible to supply the electrical energy regenerated from the kinetic energy of the vehicle to both of the low voltage system circuit and the high voltage system circuit. Further, there is no need to stop the power generation operation of the power generation unit in an intermittent manner, so the amount of regeneration of kinetic energy can be increased as much as possible.

Accordingly, according to the present invention, in the regenerative control system of a vehicle which serves to regenerate the kinetic energy of the vehicle to electrical energy at the time of deceleration running of the vehicle so that the electrical energy thus regenerated is supplied to the low voltage system circuit and the high voltage system circuit in an alternate manner, a regenerative ratio can be improved while suppressing a change in the braking force caused by a change in the power generation voltage.

The control unit according to the present invention may once stop the power generation of the power generation unit at the time of changing the power generation voltage of the power generation unit. For example, the control unit may once stop a field current applied to the power generation unit. It is not necessary to make the period of the stop at that time so long that the power generation voltage of the power generation unit drops to zero, but such a short period of time is sufficient as to allow the power generation voltage of the power generation unit to drop a voltage lower than the low voltage.

According to such control, it is possible to avoid a situation where an overvoltage acts on electrical components such as the power generation unit and so on at the time of the change over of the power generation voltage. As a result, it becomes possible to suppress the deterioration in durability of the power generation unit and so on.

The control unit according to the present invention may increase electric power consumption of an electric load contained in said low voltage system circuit or in said high voltage system circuit, in cases where an amount of charge of said low voltage battery or said high voltage battery has reached an upper limit value.

In cases where the amount of charge of the low voltage battery or the high voltage battery has reached the upper limit value, if the electrical energy regenerated by said power generation unit is supplied to the low voltage battery or the high voltage battery, the low voltage battery or the high voltage battery may fall into an overcharged state. On the other hand, there can also be considered a method of suppressing the overcharge of the low voltage battery or the high voltage battery by decreasing the proportion in the cycle of duty control occupied by the period of time of power generation of the low voltage or the period of time of power generation of the high voltage. In that case, there will be a possibility that the magnitude of the regenerative braking force may become a magnitude unsuitable for the required deceleration, thus giving an odd or uncomfortable feeling to the driver or passenger(s).

Consequently, in cases where the electric power consumption of an electric load contained in the low voltage system circuit or in the high voltage system circuit is made to increase when the amount of charge of the low voltage battery or the high voltage battery has reached the upper limit value, it becomes possible to avoid the overcharge of the low voltage battery or the high voltage battery, while maintaining the magnitude of the regenerative braking force at a magnitude suitable for the required deceleration.

Here, note that when the ratio between the period of time for the power generation unit to generate the low voltage electrical energy and the period of time for the power generation unit to generate the high voltage electrical energy is decided based on the required deceleration of the vehicle, there will be cases where the proportion of the period of time to generate said high voltage electrical energy in the cycle of duty control may exceed 100% or may falls below 0%. In such a case, when the power generation voltage of the power generation unit is fixed to the above-mentioned high voltage or low voltage, the magnitude of the regenerative braking force may become an unsuitable magnitude for the required deceleration.

Accordingly, the control unit of the present invention may make the power generation voltage of the power generation unit higher than said high voltage, in cases where the proportion of the period of time to generate said high voltage electrical energy exceeds 100%. In that case, it is possible to avoid a situation where the magnitude of the regenerative braking force becomes too small with respect to the required deceleration of the vehicle. In addition, the control unit of the present invention may make the power generation voltage of the power generation unit lower than said low voltage, in cases where the proportion of the period of time to generate said high voltage electrical energy falls below 0%. In that case, it is possible to avoid a situation where the magnitude of the regenerative braking force becomes too large with respect to the required deceleration of the vehicle.

Effects of the Invention

According to the present invention, in a regenerative control system of a vehicle which serves to regenerate kinetic energy of the vehicle to electrical energy at the time of deceleration running of the vehicle so that the electrical energy thus regenerated is charged to a low voltage system battery and a high voltage system battery in an alternate manner, regenerative efficiency can be improved while suppressing a change in torque caused by a change in a power generation voltage.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
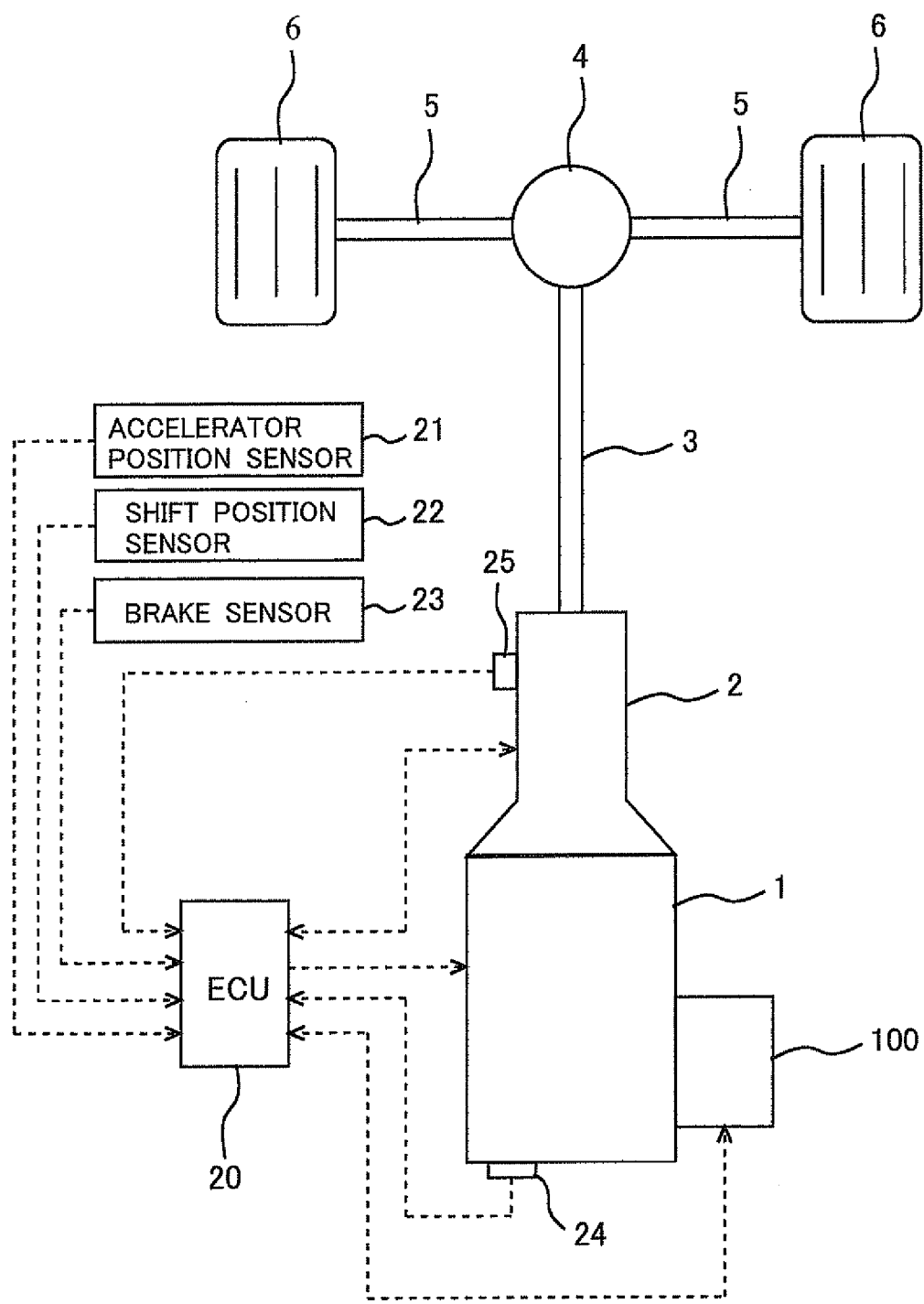
FIG. 1 is a view showing the schematic construction of a vehicle to which the present invention is applied.

First, reference will be made to a first embodiment of the present invention based on FIGS. 1 through 8. FIG. 1 is a view showing the schematic construction of a vehicle to which the present invention is applied.

In FIG. 1, an internal combustion engine 1 as a prime mover is mounted on the vehicle. An output shaft of the internal combustion engine 1 is connected with an input shaft of a transmission 2. An output shaft of the transmission 2 is connected with a differential gear unit 4 through a propeller shaft 3. Two drive shafts 5 are connected with the differential gear unit 4, and a pair of left and light drive wheels 6 are connected with the drive shafts 5, respectively.

As the above-mentioned transmission 2, there is exemplified a combination of a torque converter or a clutch mechanism, and a speed change gear that changes a gear ratio in a stepwise manner or in a stepless manner.

The power outputted from the internal combustion engine 1 (rotating or running torque of the output shaft thereof), after being changed in speed by the transmission 2, is transmitted to the propeller shaft 3, and it is then transmitted to the drive shafts 5 and the drive wheels 6 after being reduced in speed or slowed down by the differential gear unit 4.

Figure 2:
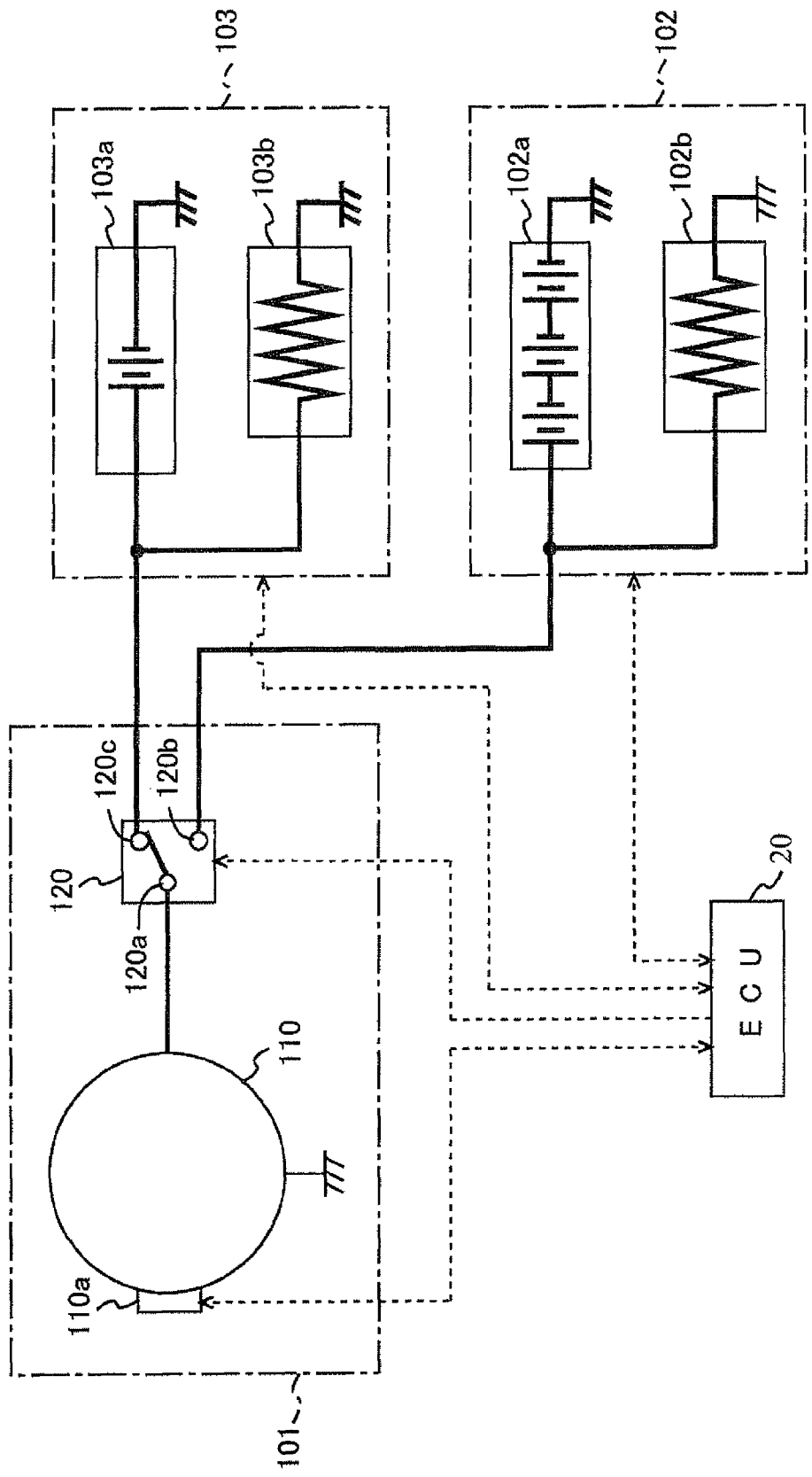
FIG. 2 is a view schematically showing the construction of an electrical system circuit.

An electrical system circuit 100 is arranged in combination or parallel with the internal combustion engine 1. The electrical system circuit 100 is provided with a power generation unit 101, a high voltage system circuit 102, and a low voltage system circuit 103, as shown in FIG. 2.

The power generation unit 101 is provided with an alternator 110 and a changeover switch 120. The alternator 110 is a generator which is connected with the output shaft of the internal combustion engine 1 (or a member which rotates in association with the output shaft) through pulleys and a belt, etc., so that it converts the kinetic energy (rotational energy) of the output shaft into electrical energy. Specifically, the alternator 110 is a three-phase AC generator which is equipped with a stator coil having a three-phase winding, a field coil wound around a rotor, a commutator that rectifies an alternating current generated in the stator coil into a direct current, and a regulator 110a that changes over between turn-on and turn-off a field current to the field coil. When a field current is supplied to the field coil, the alternator 110 constructed in this manner generates an induction current (three-phase AC current) in the stator coil, rectifies the three-phase AC current thus generated into a DC current, and outputs it.

The changeover switch 120 is a device to cause an output of the alternator 110 to be inputted to either one of the low voltage system circuit 103 and the high voltage system circuit 102. The changeover switch 120 is equipped with one input terminal 120a and two output terminals 120b, 120c, and serves to make either one of the two output terminals 120b, 120c conductive with the input terminal 120a. It is constructed such that the output of the alternator 110 is inputted to the input terminal 120a. One output terminal (hereinafter referred to as a "first output terminal") 120b of the two output terminals 120b, 120c is connected to the high voltage system circuit 102. The other (hereinafter referred to as a "second output terminal") 120c of the two output terminals 120b, 120c is connected to the low voltage system circuit 103. Here, note that although a contact-carrying switch or contact switch can also be used as the changeover switch 120, it is desirable to use a contactless switch.

The high voltage system circuit 102 is a circuit which can output and input electricity of a high voltage Vh (e.g., about 43.5 V), and is also a circuit in which a high voltage battery 102a and a high voltage load 102b are connected in parallel to each other. The high voltage load 102b is, for example, a heater for heating lubricating oil in the internal combustion engine 1, a heater for heating cooling water in the internal combustion engine 1, a heater for heating an exhaust gas purification apparatus such as a catalyst, or a motor assist supercharger, or the like. On the other hand, the low voltage system circuit 103 is a circuit which can output and input electricity of a low voltage Vl (e.g., about 14.5 V), and is also a circuit in which a low voltage battery 103a and a low voltage load 103b are connected in parallel to each other. The low voltage load 103b is, for example, one of various kinds of actuators, a fan for a radiator, or the like.

Here, reverting to FIG. 1, on the vehicle, there is mounted an electronic control unit (ECU) 20 for controlling the internal combustion engine 1, the transmission 2 and the electrical system circuit 100 in an electrical manner, in combination therewith. Here, note that in FIG. 1, the single ECU 20 is used, but it may be divided into three parts, i.e., an ECU for controlling the internal combustion engine 1, an ECU for controlling the transmission 2, and an ECU for controlling the electrical system circuit 100.

It is constructed such that output signals of various kinds of sensors such as an accelerator position sensor 21, a shift position sensor 22, a brake sensor 23, a crank position sensor 24, a vehicle speed sensor 25 and so on, are inputted to the ECU 20. In addition, it is also constructed such that the discharge voltages of the high voltage battery 102a and the low voltage battery 103a are also inputted to the ECU 20.

The accelerator position sensor 21 is a sensor which outputs an electrical signal corresponding to the amount of operation (the amount of depression or step down) of an accelerator pedal. The shift position sensor 22 is a sensor which outputs an electrical signal corresponding to the position of operation of a shift lever. The brake sensor 23 is a sensor which outputs an electrical signal corresponding to the amount of operation (the amount of depression or step down) of a brake pedal. The crank position sensor 24 is a sensor which outputs an electrical signal corresponding to the rotational position of the output shaft (crankshaft) of the internal combustion engine 1. The vehicle speed sensor 25 is a sensor which outputs an electrical signal corresponding to the travel speed of the vehicle.

The ECU 20 controls the internal combustion engine 1, the transmission 2, the electrical system circuit 100, and so on based on the output signals of the above-mentioned various kinds of sensors. In the following, a control method for the electrical system circuit 100 will be described.

The ECU 20 changes the power generation voltage of the alternator 110 by performing the duty control of the on and off of the regulator 110a. For example, in cases where the power generation voltage of the alternator 110 is made higher, the ECU 20 decides a duty ratio in such a manner that the on time of the regulator 110a becomes long (the off time thereof becomes short). In cases where the power generation voltage of the alternator 110 is made lower, the ECU 20 decides the duty ratio in such a manner that the on time of the regulator 110a becomes short (the off time thereof becomes long). The ECU 20 also senses an actual power generation voltage of the alternator 110, and carries out feedback control of the duty ratio in accordance with a difference between the actual power generation voltage and a target power generation voltage.

When electricity is supplied to the high voltage system circuit 102, the ECU 20 carries out the duty control of the regulator 110a in such a manner that the power generation voltage of the alternator 110 is in match with the voltage (high voltage) Vh which is suitable for the high voltage system circuit 102, and at the same time, controls the changeover switch 120 in such a manner that the input terminal 120a and the first output terminal 120b are connected to each other.

When electricity is supplied to the low voltage system circuit 103, the ECU 20 carries out the duty control of the regulator 110a in such a manner that the power generation voltage of the alternator 110 is in match with the voltage (low voltage) Vl which is suitable for the low voltage system circuit 103, and at the same time, controls the changeover switch 120 in such a manner that the input terminal 120a and the second output terminal 120c are connected to each other.

In addition, when the vehicle is in a deceleration running state, for example, when the vehicle speed is larger than zero and the amount of operation of the accelerator pedal is zero, the kinetic energy of the drive wheels 6 is transmitted to the alternator 110 through the drive shafts 5, the differential gear unit 4, the propeller shaft 3, the transmission 2, and the internal combustion engine 1. In other words, the rotor of the alternator 110 is driven to rotate in association with the drive wheels 6. In that case, when a field current is applied to the alternator 110, the kinetic energy of the drive wheels 6 can be converted (regenerated) into electrical energy. When the electrical energy obtained according to such a method is charged to the high voltage battery 102a and the low voltage battery 103a, the number of opportunities to operate the alternator 110 by the use of generating power of the internal combustion engine 1 can be reduced, so the fuel consumption of the internal combustion engine 1 can be decreased. Accordingly, by applying a field current to the alternator 110 when the vehicle is in a deceleration running state, the ECU 20 carries out regenerative control to convert (regenerate) the kinetic energy of the drive wheels 6 to electrical energy.

When the power generation voltage of the alternator 110 is set to the high voltage Vh at the time the regenerative control is carried out, the amount of the kinetic energy regenerated as electrical energy can be increased. However, there will be a problem that a regenerative braking force becomes excessively large or it becomes impossible to charge the low voltage battery 103a. On the other hand, when the power generation voltage of the alternator 110 is set to the low voltage Vl at the time the regenerative control is carried out, there will be a problem that the amount of the kinetic energy regenerated as electrical energy becomes small, or it becomes impossible to charge the high voltage battery 102a.

In contrast to this, there can be considered a method of charging both of the high voltage battery 102a and the low voltage battery 103a by changing over the power generation voltage of the alternator 110 during deceleration running of the vehicle. However, at the time when the power generation voltage of the alternator 110 is changed, the regenerative braking force is changed greatly. For that reason, it is necessary to carry out control to stop the power generation operation intermittently, or control to regulate the braking force of a friction brake, etc., at the time of changing the power generation voltage.

Figure 3:
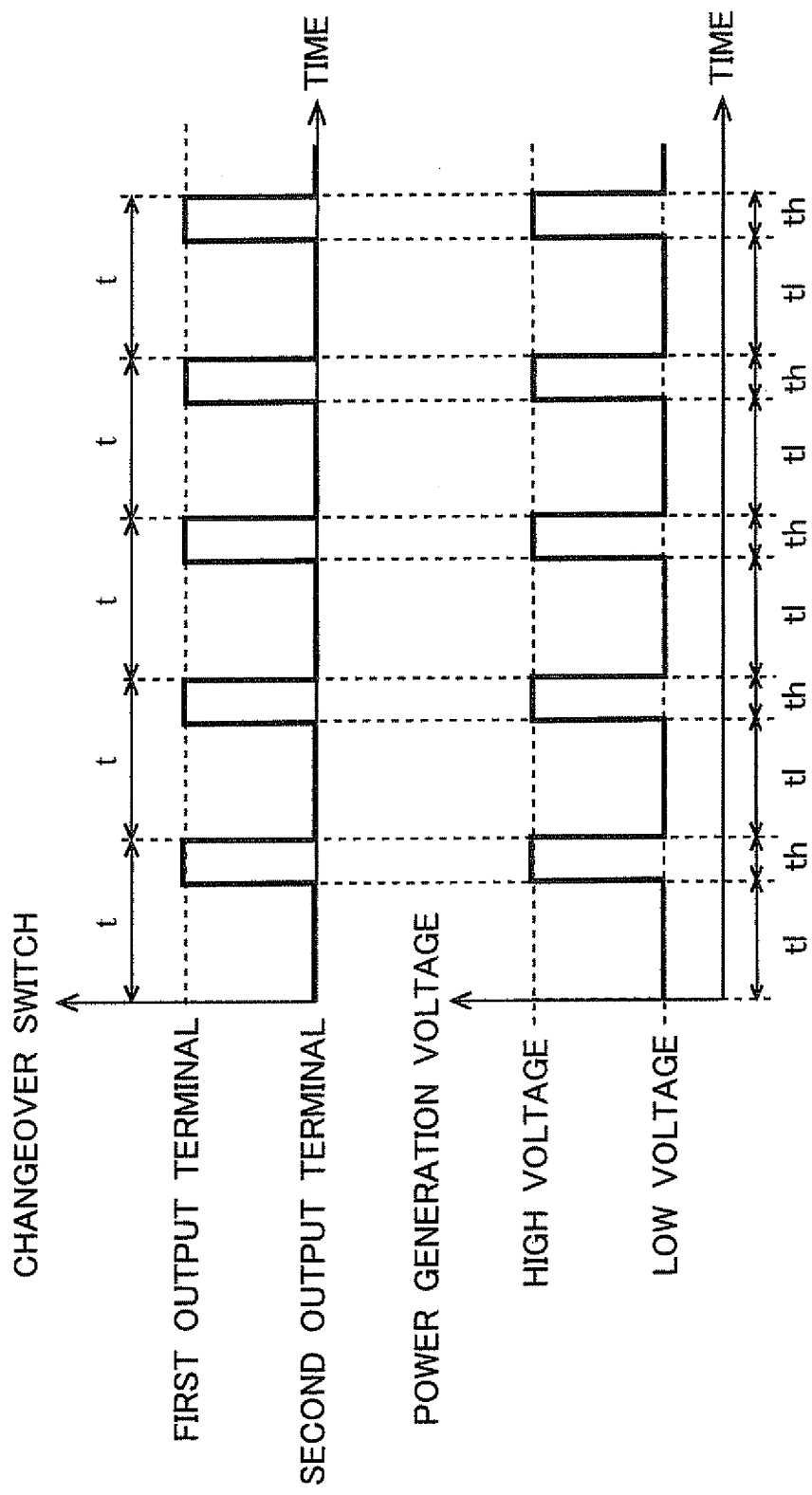
FIG. 3 is a timing chart showing an execution method for regenerative control in a first embodiment.

In the regenerative control of this embodiment, the ECU 20 controls the changeover switch 120 in such a manner that high voltage energy and low voltage energy are electrically generated in an alternate manner, and at the same time, the input terminal 120a is selectively connected to the first output terminal 120b and the second output terminal 120c in an alternate manner, as shown in FIG. 3. Specifically, the ECU 20 carries out duty control of the ratio of a period of time during which the alternator 110 generates high voltage energy (a period of time during which the input terminal 120a is connected to the first output terminal 120b) th, and a period of time during which the alternator 110 generates low voltage energy (a period of time during which the input terminal 120a is connected to the second output terminal 120c) tl. A cycle t (=th+tl) of the duty control is set to be short (e.g., about 20 ms) to such an extent that the driver or passenger of the vehicle feels that the magnitude of the regenerative braking force is substantially constant. Moreover, the ratio of the period of time tl for the alternator 110 to generate low voltage energy and the period of time th for the alternator 110 to generate high voltage energy is decided in accordance with the required deceleration of the vehicle.

The required deceleration of the vehicle can be calculated by using, as parameters, the amount of operation of the brake pedal, the degree of opening of the accelerator pedal, the gear position of the transmission 2, the coefficient of friction of a road surface, and so on. In that case, the relation of the required deceleration of the vehicle to the amount of operation of the brake pedal, the degree of opening of the accelerator pedal, the gear position of the transmission 2 and the coefficient of friction of the road surface may be made into a map.

The ECU 20 calculates a decelerating force (required decelerating force) Ntrg necessary for obtaining the required deceleration according to the following equation (1).

$$Ntrg=(\text{required deceleration})*(\text{vehicle weight}) \quad (1)$$

Subsequently, the ECU 20 calculates a torque (required decelerating torque) Ttrg necessary for obtaining the required decelerating force according to the following equation (2).

$$Ttrg=Ntrg*(\text{tire diameter})*(\text{gear ratio})-(\text{friction torque}) \quad (2)$$

The "friction torque" in the above-mentioned equation (2) is a total sum of the friction of the internal combustion engine 1, the friction of a drive system, and so on.

The ECU 20 calculates a power (required decelerating power) Wtrg necessary for obtaining the required deceleration by assigning the above-mentioned required decelerating torque Ttrg to the following equation (3).

$$Wtrg=Ttrg*(\text{number of engine revolutions per unit time})*(2\pi/60) \quad (3)$$

The ECU 20 calculates a duty ratio γ (%) by assigning the above-mentioned required decelerating power Wtrg to the following equation (4). Here, note that the duty ratio γ referred to herein is the proportion (={th/(th+tl)}*100) which is occupied by the period of time of power generation of the high voltage energy in the cycle of duty control.

$$Wtrg=Whigh*(\gamma/100)+Wlow*\{(100-\gamma)/100\} \quad (4)$$

"Whigh" in the above-mentioned equation (4) is the electrical energy (power) which the high voltage system circuit 102 can consume per unit time, and "Wlow" in the equation (4) represents the electrical energy (power) which the low voltage system circuit 103 can consume per unit time.

Figure 4:
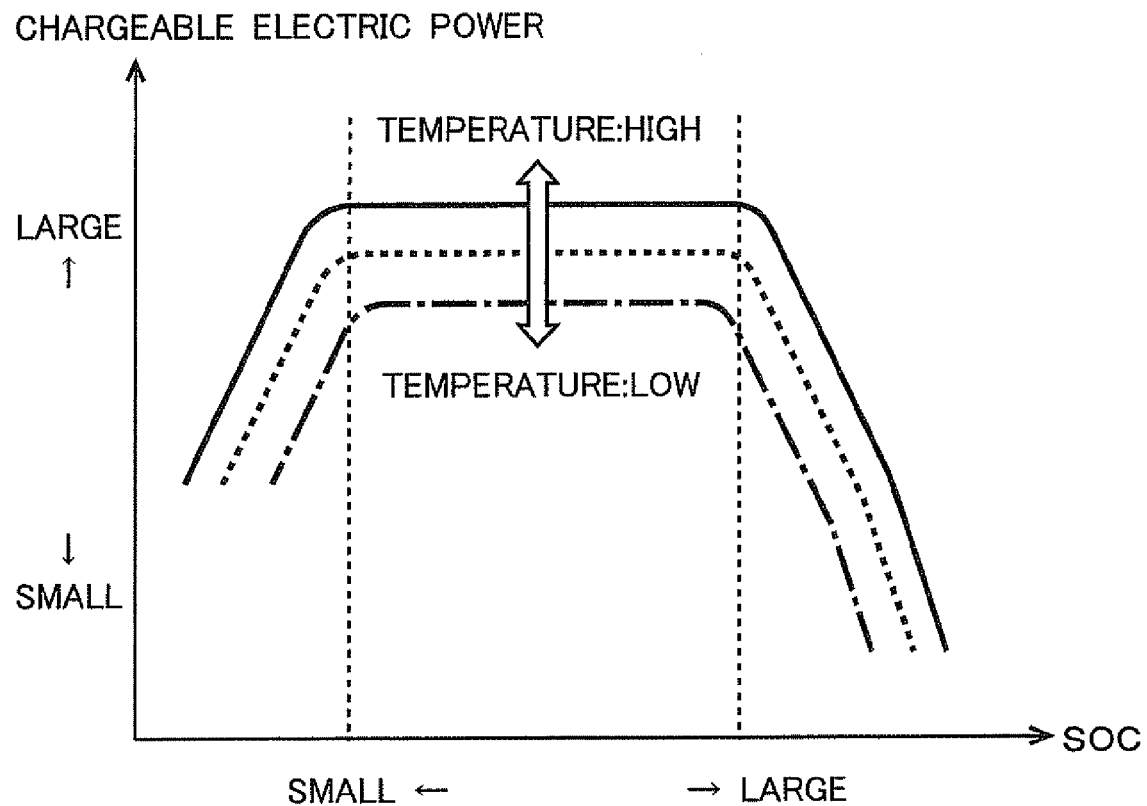
FIG. 4 is a view showing the relation between the state of charge (SOC) of a high voltage battery, the temperature and the chargeable electric power thereof.

The power Whigh of the high voltage system circuit 102 is the sum of the electrical energy (chargeable electric power) which can be received or stored by the high voltage battery 102*a*, and the electrical energy (consumable electric power) which can be consumed by the high voltage load 102*b*. The power Wlow of the low voltage system circuit 103 is the sum of the electrical energy (chargeable electric power) which can be received or stored by the low voltage battery 103*a*, and the electrical energy (consumable electric power) which can be consumed by the low voltage load 103*b*. Here, note that the chargeable electric power of the high voltage battery 102*a* can be obtained by the use of the state of charge (SOC) and the temperature of the high voltage battery 102*a* as parameters, as shown in FIG. 4. Similarly, the chargeable electric power of the low voltage battery 103*a* can also be obtained by the use of the state of charge (SOC) and the temperature of the low voltage battery 103*a* as parameters.

Figure 5:
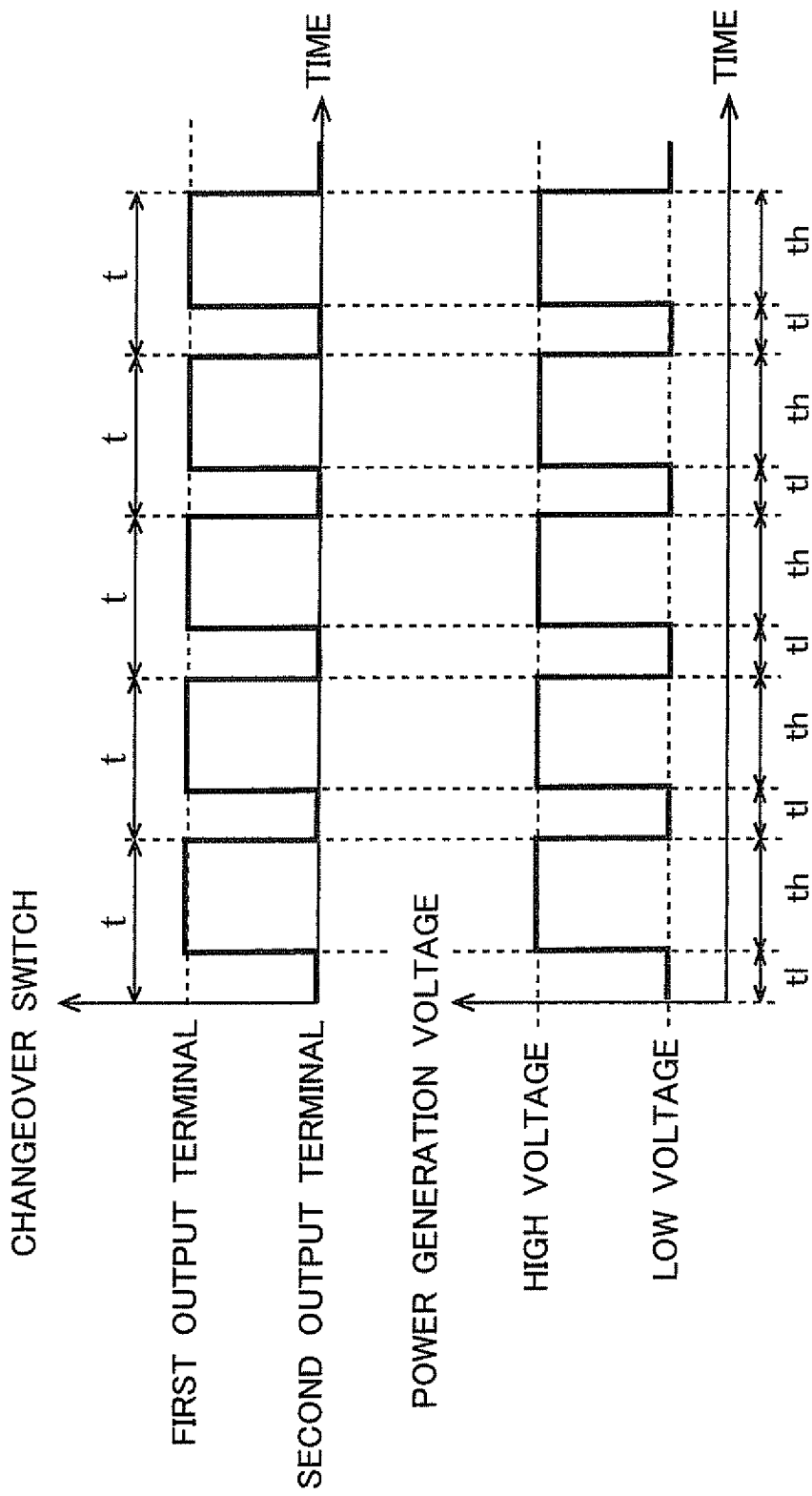
FIG. 5 is a timing chart showing an execution method for regenerative control in cases where a demanded or required deceleration is high.

Once the duty ratio γ is decided according to such a method, the period of time of power generation of the high voltage energy becomes longer when the required deceleration is large, in comparison with when it is small. For example, the above-mentioned example shown in FIG. 3 is an example of control at the time when the required deceleration is small, wherein the period of time of power generation th of the high voltage energy is set to be short. On the other hand, when the required deceleration is large, the period of time of power generation th of the high voltage energy is set to be long, as shown in FIG. 5.

The regenerative braking force at the time the when high voltage energy is generated becomes larger than the regenerative braking force at the time the low voltage energy is generated. For that reason, in cases where the period of time of power generation th of the high voltage energy is set to be long, the regenerative braking force generated during the of the cycle t becomes larger in comparison with the cases where it is set to be short. As a result, the regenerative braking force becomes a magnitude corresponding to the required deceleration.

Accordingly, when regenerative control is carried out according to the above-mentioned method, it becomes possible to adjust the magnitude of the regenerative braking force to a magnitude corresponding to the required deceleration, without making the driver conscious of the variation of the regenerative braking force resulting from the change over of the power generation voltage. In addition, it becomes not necessary to carry out control to stop or interrupt the power generation voltage intermittently, or control to regulate the braking force of the friction brake, etc., so it is possible to increase the amount of regeneration of kinetic energy as much as possible, and at the same time to simplify the control logic at the time of deceleration running, too. Moreover, electrical energy can be supplied to both of the high voltage system circuit 102 and the low voltage system circuit 103, so it also becomes possible to charge both of the high voltage battery 102*a* and the low voltage battery 103*a*.

Figure 6:
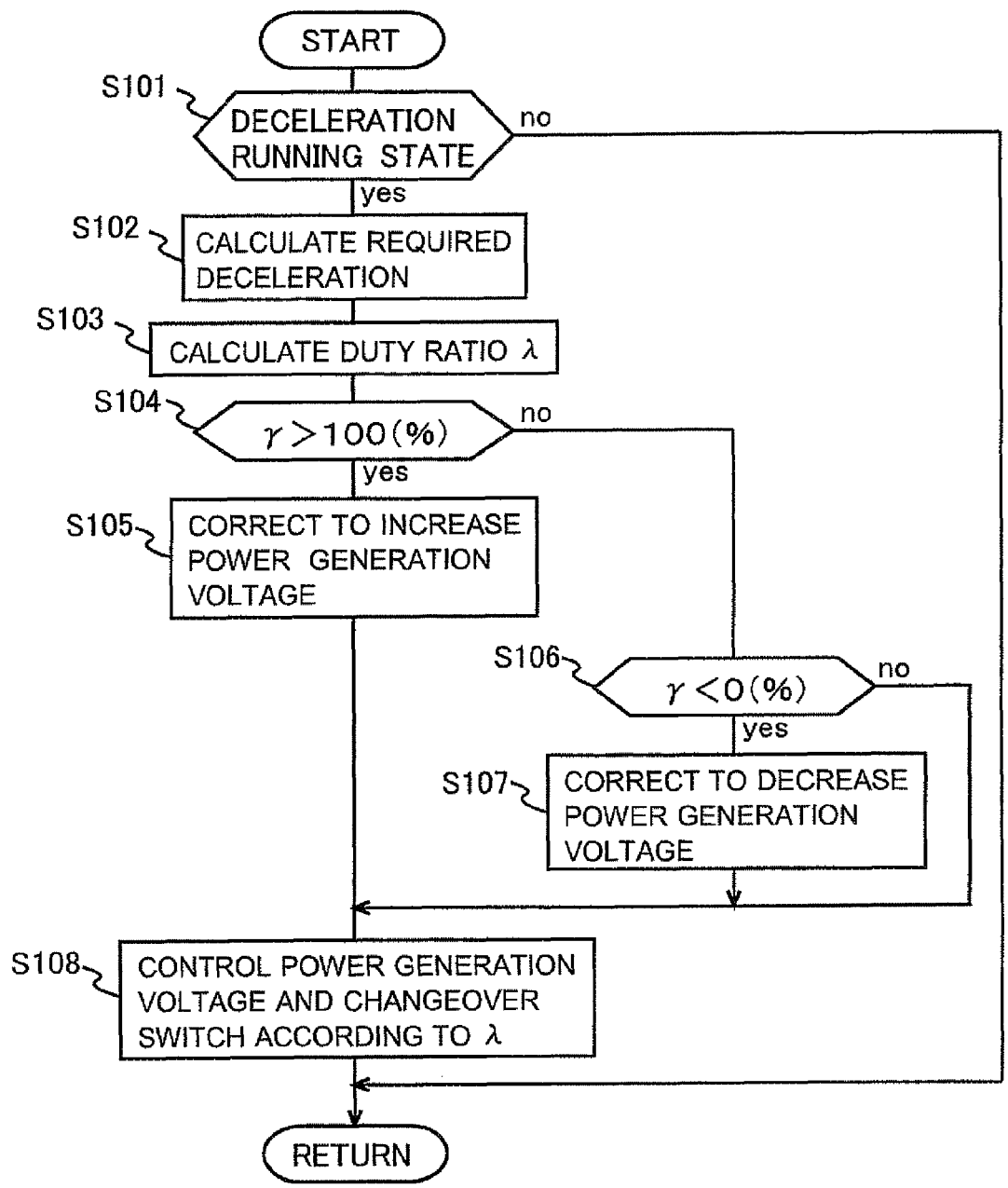
FIG. 6 is a flow chart showing a control routine which is executed by an ECU at the time when regenerative control is carried out in the first embodiment.

Hereinafter, the execution procedure of the regenerative control in this embodiment will be described in line with FIG. 6. FIG. 6 shows a control routine that is executed at the time when the ECU 20 carries out regenerative control. This control routine is a routine which has been beforehand stored in a ROM of the ECU 20, etc., and is carried out by the ECU 20 in a periodical manner.

In the control routine of FIG. 6, first in step S101, the ECU 20 determines whether the vehicle is in a deceleration running state. For example, when the output signal of the accelerator position sensor 21 (the degree of opening of the accelerator pedal) is zero (fully closed), and when the output signal of the vehicle speed sensor 25 (vehicle speed) is larger than zero, the ECU 20 makes a determination that the vehicle is in a deceleration running state.

In cases where a negative determination is made in the above-mentioned step S101, the ECU 20 ends the execution of this routine, without carrying out regenerative control. On the other hand, in cases where an affirmative determination is made in the above-mentioned step S101, the ECU 20 proceeds to S102. In step S102, the ECU 20 calculates the required deceleration of the vehicle by using, as parameters, the output signal of the accelerator position sensor 21 (the degree of opening of the accelerator pedal), the output signal of the shift position sensor 22 (the gear position), the output signal of the brake sensor 23 (the amount of operation of the brake pedal), and the coefficient of friction of the road surface.

In step S103, the ECU 20 calculates the duty ratio γ based on the required deceleration calculated in the above-mentioned step S102, and the above-mentioned equations (1) through (4). Thus, by the execution of the processing in steps S102 and S103 by means of the ECU 20, a decision unit according to the present invention is achieved.

Here, note that when the duty ratio γ is decided according to the required deceleration, there will also be cases where the duty ratio γ may become more than 100% or less than 0%. If the power generation voltage of the alternator 110 is fixed to the high voltage Vh at the time when the duty ratio γ becomes more than 100%, there will be a possibility that the regenerative braking force may become too small with respect to the required deceleration. On the other hand, if the power generation voltage of the alternator 110 is fixed to the low voltage Vl at the time when the duty ratio γ becomes less than 0%, there will be a possibility that the regenerative braking force may become too large with respect to the required deceleration.

Figure 7:
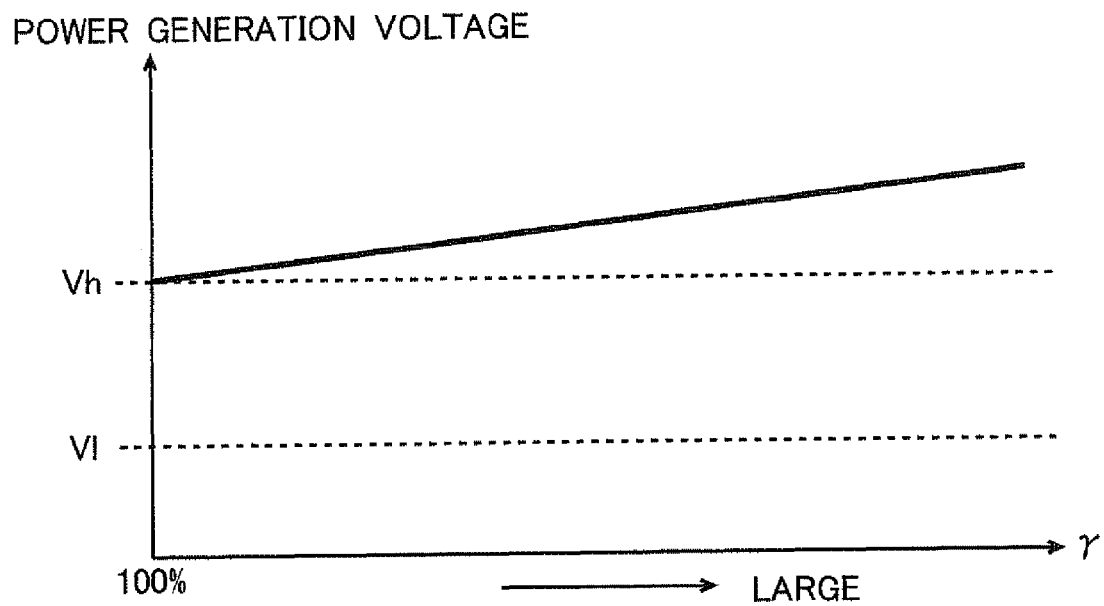
FIG. 7 is a view showing the relation between a duty ratio γ and a power generation voltage in cases where the duty ratio γ exceeds 100%.

Accordingly, in step S104, the ECU 20 determines whether the duty ratio γ calculated in the above-mentioned step S103 is larger than 100%. In cases where an affirmative determination is made in the above-mentioned step S104, the ECU 20 goes to step S105, in which it makes the power generation voltage of the alternator 110 higher than the high voltage Vh. In that case, the ECU 20 may make the power generation voltage higher in accordance with the increasing duty ratio γ, as shown in FIG. 7. When the power generation voltage of the alternator 110 is changed in this manner, it is possible to avoid a situation where the magnitude of the regenerative braking force becomes too small with respect to the required deceleration.

Figure 8:
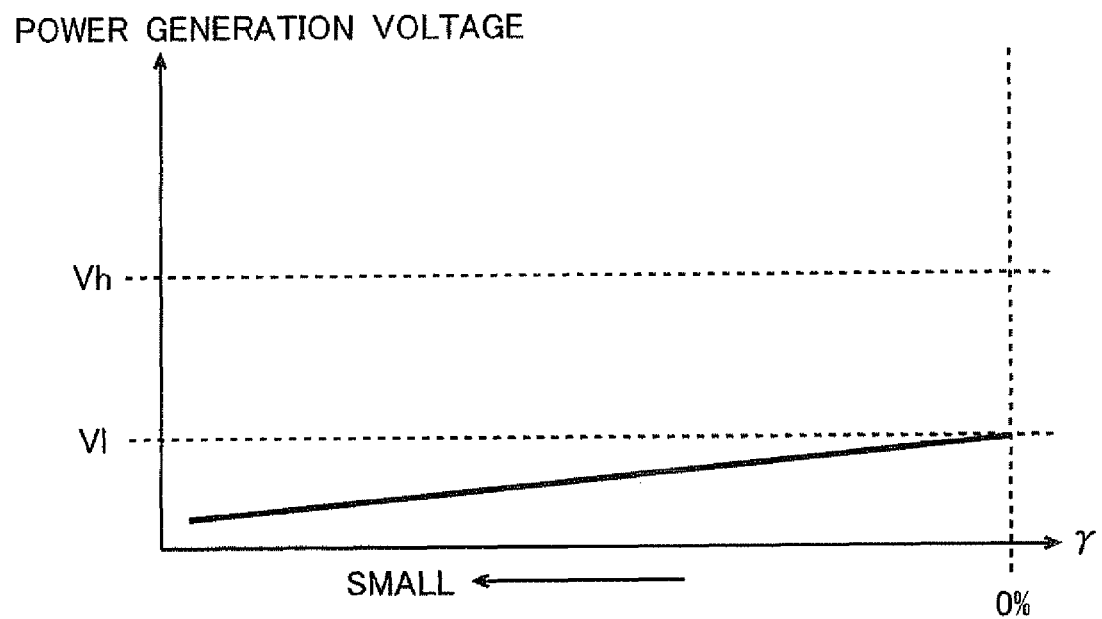
FIG. 8 is a view showing the relation between the duty ratio γ and the power generation voltage in cases where the duty ratio γ falls below 0%.

In cases where a negative determination is made in the above-mentioned step S104, the ECU 20 goes to step S106, in which it determines whether the duty ratio γ calculated in the above-mentioned step S103 is less than 0%. In cases where an affirmative determination is made in the above-mentioned step S106, the ECU 20 goes to step S107, in which it makes the power generation voltage of the alternator 110 lower than the low voltage Vl. In that case, the ECU 20 may make the power generation voltage lower in accordance with the decreasing duty ratio γ, as shown in FIG. 8. When the power generation voltage of the alternator 110 is changed in this manner, it is possible to avoid a situation where the magnitude of the regenerative braking force becomes too large with respect to the required deceleration.

After carrying out the processing of the above-mentioned step S105 or the above-mentioned step S107, or in cases where a negative determination is made in the above-mentioned step S106, the ECU 20 goes to step S108. In step S108, the power generation voltage of the alternator 110 is controlled according to the duty ratio γ calculated in the above-mentioned step S103, and at the same time, the changeover switch 120 is changed over in synchronization with the change over of the power generation voltage. Thus, by carrying out the processing in step S108 by means of the ECU 20, a control unit according to the present invention is achieved.

According to the control routine as described above, when the vehicle is in the deceleration running state, it is possible to adjust the magnitude of the regenerative braking force to a magnitude corresponding to the required deceleration, without making the driver conscious of the variation of the regenerative braking force caused by the change over of the power generation voltage, or without decreasing the amount of regeneration of kinetic energy to a large extent.

Second Embodiment

Figure 9:
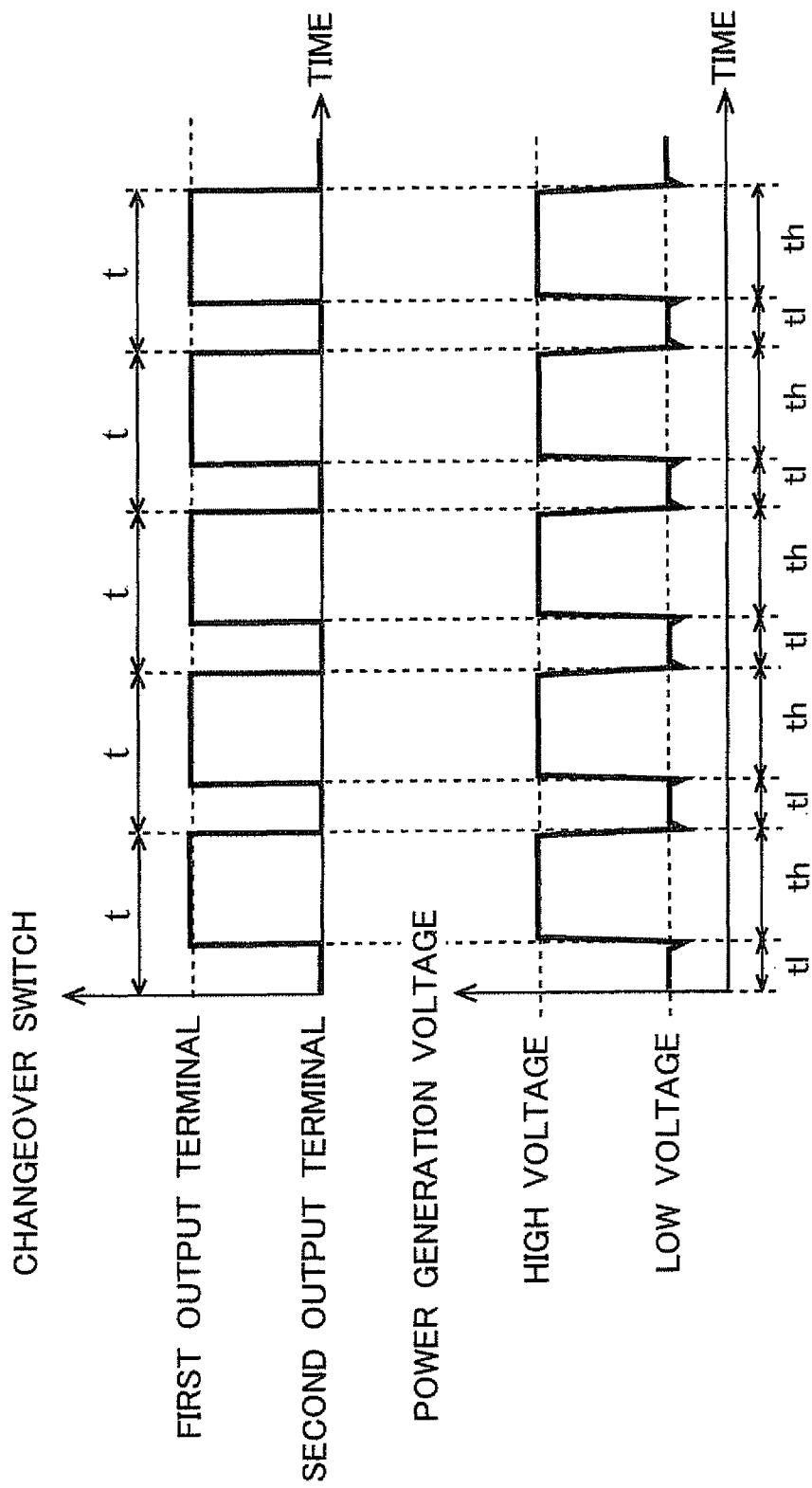
FIG. 9 is a timing chart showing an execution method for regenerative control in a second embodiment.

Next, reference will be made to a second embodiment of the present invention based on FIG. 9. Here, a construction different from that of the above-mentioned first embodiment will be described, and an explanation of the same construction will be omitted.

The difference between the above-mentioned first embodiment and this second embodiment is the point that the application of a field current to the alternator 110 is once stopped at the time of changing over the power generation voltage of the alternator 110. It is not necessary to make the period of the stop at that time so long that the power generation voltage of the alternator 110 drops to zero, but such a short period of time is sufficient as to allow the power generation voltage of the alternator 110 to become lower than the low voltage Vl.

When the power generation voltage of the alternator 110 is changed over from either one of the high voltage Vh and the low voltage Vl to the other, there will be a possibility that the terminal voltage of the alternator 110 may go up rapidly, and an overvoltage may act on the component parts of the alternator 110. In addition, in cases where the changeover switch 120 is constructed of a contact-carrying or contact switch, sparks may occur in its contact points.

In contrast to this, in the regenerative control of this second embodiment, at the time of changing over the power generation voltage of the alternator 110 from either one of the high voltage Vh and the low voltage Vl to the other, the ECU 20 carries out control in such a manner that the application of a field current to the alternator 110 is once stopped. According to such a method, when the changeover switch 120 carries out a switching operation, the power generation voltage of the alternator 110 drops below the low voltage Vl, as shown in FIG. 9, and hence, it becomes possible to avoid the occurrence of a situation where the terminal voltage of the alternator 110 goes up rapidly, or of a situation where a spark is generated in the contact points of the changeover switch 120. As a result, it becomes possible to suppress the deterioration in durability of the alternator 110 or the changeover switch 120.

Third Embodiment

Next, reference will be made to a third embodiment of the present invention based on FIG. 10. Here, a construction different from that of the above-mentioned first embodiment will be described, and an explanation of the same construction will be omitted.

The difference between the above-mentioned first embodiment and this third embodiment is the point that in cases where the state or amount of charge (SOC) of the high voltage battery 102a or the low voltage battery 103a is large, by increasing the electric power consumption of the high voltage load 102b or the low voltage battery 103a, the magnitude of the regenerative braking force is adjusted to a magnitude suitable for the required deceleration, while suppressing overcharge of the high voltage battery 102a or the low voltage battery 103a.

When the duty ratio γ is decided based on the equations (1) through (4) referred to in the above-mentioned first embodiment, the duty ratio γ may exceed 100%. In particular, when the state of charge (SOC) of the high voltage battery 102a or the low voltage battery 103a exceeds an upper limit value thereof, it will become easy for the duty ratio γ to exceed 100%.

On the other hand, in the regenerative control of this third embodiment, the ECU 20 carries out control in such a manner that in cases where the state of charge (SOC) of the high voltage battery 102a or the low voltage battery 103a exceeds the upper limit value, the duty ratio γ is decided after increasing the electric power consumption of the high voltage load 102*b* or the low voltage load 103*b* as much as possible, and at the same time, setting the power generation voltage of the alternator 110 lower than the chargeable voltages of the high voltage battery 102*a* and the low voltage battery 103*a* (e.g., the discharged voltages of the individual batteries). When the regenerative control is carried out according to such a method, the duty ratio γ comes to be suppressed equal to or less than 100%, so the magnitude of the regenerative braking force can be adjusted to a magnitude corresponding to the required deceleration, while avoiding overcharge of the high voltage battery 102*a* and the low voltage battery 103*a*. Here, note that the "upper limit value" referred to above is a value which is obtained by deducing a margin from a minimum value of the state (amount) of charge (SOC) in which the high voltage battery 102*a* or the low voltage battery 103*a* becomes overcharged.

Hereinafter, the execution procedure of the regenerative control in this third embodiment will be described in line with FIG. 10. FIG. 10 shows a control routine that is executed at the time when the ECU 20 carries out regenerative control. In FIG. 10, the same symbols are attached to the same processes as those in the above-mentioned control routine of the first embodiment (see FIG. 6).

Figure 10:
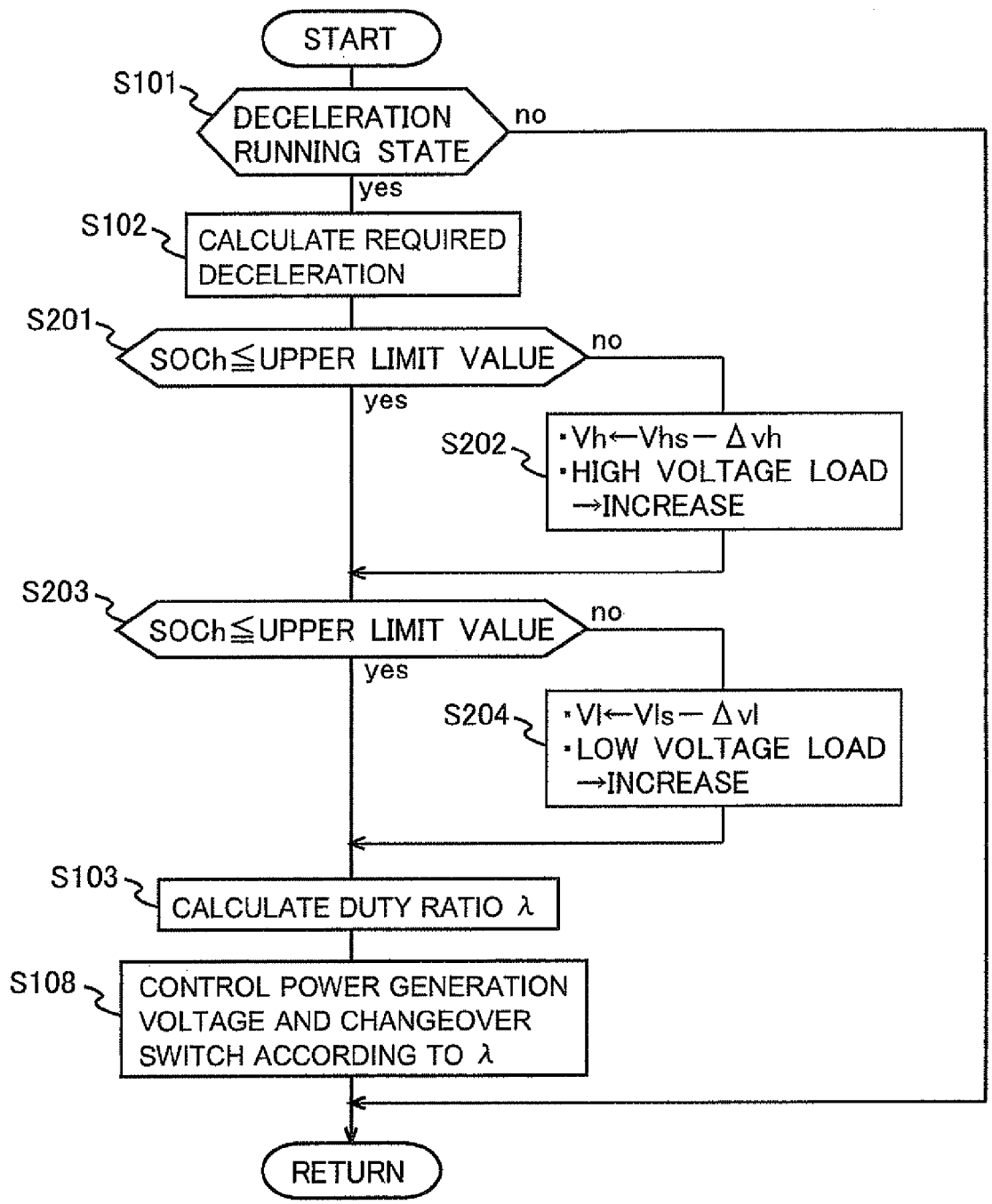
FIG. 10 is a flow chart showing a control routine which is executed by an ECU at the time when regenerative control is carried out in a third embodiment.

In the control routine of FIG. 10, the ECU 20 goes to step S201 after having carried out the processing of S102. In step S201, the ECU 20 determines whether the state (amount) of charge SOCh of the high voltage battery 102*a* is equal to or less than the upper limit value. In cases where a negative determination is made in step S201 (SOCh>the upper limit value), the ECU 20 goes to step S202 and corrects the high voltage Vh to a voltage lower than the chargeable voltage of the high voltage battery 102*a*. For example, the ECU 20 sets, as the high voltage Vh, a value which is obtained by subtracting a predetermined amount Δvh from a discharge voltage (or rated voltage) Vhs of the high voltage battery 102*a*. Moreover, the ECU 20 increases the electric power consumption of the high voltage load 102*b* as much as possible. In cases where an affirmative determination is made in the above-mentioned step S201 (SOCh≤the upper limit value), or in cases where the processing of the above-mentioned step S202 has been carried out, the ECU 20 goes to step S203.

In step S203, the ECU 20 determines whether the state (amount) of charge SOCl of the low voltage battery 103*a* is equal to or less than the upper limit value. In cases where a negative determination is made in step S203 (SOCl>the upper limit value), the ECU 20 goes to step S204 and corrects the low voltage Vl to a voltage lower than the chargeable voltage of the low voltage battery 103*a*. For example, the ECU 20 sets, as the low voltage Vl, a value which is obtained by subtracting a predetermined amount Δvl from a discharge voltage (or rated voltage) Vls of the low voltage battery 103*a*. Moreover, the ECU 20 increases the electric power consumption of the low voltage load 103*b* as much as possible. In cases where an affirmative determination is made in the above-mentioned step S203 (SOCl≤upper limit value), or in cases where the processing of the above-mentioned step S204 has been carried out, the ECU 20 goes to step S103.

In step S103, the ECU 20 calculates the duty ratio γ based on the equations (1) through (4) referred to in the above-mentioned first embodiment, and the required deceleration calculated in the above-mentioned step S102. At that time, if correction processing of the high voltage Vh and power consumption increasing processing of the high voltage load 102*b* are carried out in step S202, the ECU 20 will decide Whigh in the equation (4) based on the high voltage Vh which has been subjected to the correction processing, and the electric power consumption which has been subjected to the power consumption increasing processing. In addition, if correction processing of the low voltage Vl and power consumption increasing processing of the low voltage load 103*b* are carried out in step S204, the ECU 20 will decide Wlow in the equation (4) based on the low voltage Vl which has been subjected to the correction processing, and the electric power consumption which has been subjected to the power consumption increasing processing. When the duty ratio γ is decided in this manner, it becomes possible to suppress the duty ratio γ to 100% or less, and at the same time to refrain from charging the high voltage battery 102*a* or the low voltage battery 103*a*, even in cases where the state (amount) of charge (SOC) of the high voltage battery 102*a* or the low voltage battery 103*a* exceeds the upper limit value thereof.

After carrying out the processing of the above-mentioned step S103, the ECU 20 goes to step S108, and controls the power generation voltage of the alternator 110 and the changeover switch 120 in accordance with the duty ratio γ decided in the above-mentioned step S103.

According to the embodiments as described above, the magnitude of the regenerative braking force can be adjusted to a magnitude suitable for the required deceleration, while avoiding overcharge of the high voltage battery 102*a* and the low voltage battery 103*a*.

Here, note that the above-mentioned first through third embodiments can be combined with another wherever possible.

DESCRIPTION OF THE REFERENCE NUMERALS AND SYMBOLS 1 internal combustion engine
2 transmission
3 propeller shaft
4 differential gear unit
5 drive shafts
6 drive wheels
20 ECU
21 accelerator position sensor
22 shift position sensor
23 brake sensor
24 crank position sensor
25 vehicle speed sensor
100 electrical system circuit
101 power generation unit
102 high voltage system circuit
102*a* high voltage battery
102*b* high voltage load
103 low voltage system circuit
103*a* low voltage battery
103*b* low voltage load
110 alternator
110*a* regulator
120 changeover switch
120*a* input terminal
120*b* first output terminal
120*c* second output terminal

The invention claimed is:
1. A regenerative control system of a vehicle comprising:
a low voltage system circuit including a low voltage battery;
a high voltage system circuit including a high voltage battery of which a rated voltage is higher than that of said low voltage battery;
a power generation unit that generates electrical energy of a low voltage suitable for said low voltage system circuit or electrical energy of a high voltage suitable for said high voltage system circuit by making use of kinetic energy of the vehicle; and a control unit that controls said power generation unit in such a manner that electric power generation is carried out while changing over a generation voltage between said low voltage and said high voltage in an alternate manner when the vehicle is in a deceleration running state, and at the same time duty controls a ratio between a period of time during which said low voltage electrical energy is generated, and a period of time during which said high voltage electrical energy is generated.

2. The regenerative control system of a vehicle according to claim 1, further comprising:

a decision unit that decides the ratio between the period of time for said power generation unit to generate said low voltage electrical energy and the period of time for said power generation unit to generate said high voltage electrical energy, in accordance with a deceleration required of the vehicle;

wherein said control unit carries out duty control of the power generation voltage of said power generation unit in accordance with the ratio decided by said decision unit.

3. The regenerative control system of a vehicle according to claim 2, wherein said control unit once stops the power generation of said power generation unit at the time when the power generation voltage of said power generation unit is changed over.

4. The regenerative control system of a vehicle according to claim 3, wherein said control unit increases electric power consumption of an electric load contained in said low voltage system circuit or in said high voltage system circuit, in cases where an amount of charge of said low voltage battery or said high voltage battery has reached an upper limit value.

5. The regenerative control system of a vehicle according to claim 4, wherein said control unit makes the power generation voltage of said power generation unit higher than said high voltage, in cases where a proportion of the period of time to generate said high voltage electrical energy exceeds 100%.

6. The regenerative control system of a vehicle according to claim 5, wherein said control unit makes the power generation voltage of said power generation unit lower than said low voltage, in cases where a proportion of the period of time to generate said high voltage electrical energy is less than 0%.

7. The regenerative control system of a vehicle according to claim 4, wherein said control unit makes the power generation voltage of said power generation unit lower than said low voltage, in cases where a proportion of the period of time to generate said high voltage electrical energy is less than 0%.

8. The regenerative control system of a vehicle according to claim 3, wherein said control unit makes the power generation voltage of said power generation unit higher than said high voltage, in cases where a proportion of the period of time to generate said high voltage electrical energy exceeds 100%.

9. The regenerative control system of a vehicle according to claim 8, wherein said control unit makes the power generation voltage of said power generation unit lower than said low voltage, in cases where a proportion of the period of time to generate said high voltage electrical energy is less than 0%.

10. The regenerative control system of a vehicle according to claim 3, wherein said control unit makes the power generation voltage of said power generation unit lower than said low voltage, in cases where a proportion of the period of time to generate said high voltage electrical energy is less than 0%.

11. The regenerative control system of a vehicle according to claim 2, wherein said control unit increases electric power consumption of an electric load contained in said low voltage system circuit or in said high voltage system circuit, in cases where an amount of charge of said low voltage battery or said high voltage battery has reached an upper limit value.

12. The regenerative control system of a vehicle according to claim 11, wherein said control unit makes the power generation voltage of said power generation unit higher than said high voltage, in cases where a proportion of the period of time to generate said high voltage electrical energy exceeds 100%.

13. The regenerative control system of a vehicle according to claim 12, wherein said control unit makes the power generation voltage of said power generation unit lower than said low voltage, in cases where a proportion of the period of time to generate said high voltage electrical energy is less than 0%.

14. The regenerative control system of a vehicle according to claim 11, wherein said control unit makes the power generation voltage of said power generation unit lower than said low voltage, in cases where a proportion of the period of time to generate said high voltage electrical energy is less than 0%.

15. The regenerative control system of a vehicle according to claim 2, wherein said control nit makes the power generation voltage of said power generation unit higher than said high voltage, in cases where a proportion of the period of time to generate said high voltage electrical energy exceeds 100%.

16. The regenerative control system of a vehicle according to claim 15, wherein said control unit makes the power generation voltage of said power generation unit lower than said low voltage, in cases where a proportion of the period of time to generate said high voltage electrical energy is less than 0%.

17. The regenerative control system of a vehicle according to claim 2, wherein said control unit makes the power generation voltage of said power generation unit lower than said low voltage, in cases where a proportion of the period of time to generate said high voltage electrical energy is less than 0%.

* * * * *